(12) United States Patent
Olsen

(10) Patent No.: US 8,313,295 B2
(45) Date of Patent: Nov. 20, 2012

(54) LIGHTNING PROTECTION SYSTEM FOR A WIND TURBINE

(75) Inventor: Kaj Olsen, Riiskov (DK)

(73) Assignee: Siemens Aktiengesellschaft, München (DE)

( * ) Notice: Subject to any disclaimer, the term of this patent is extended or adjusted under 35 U.S.C. 154(b) by 643 days.

(21) Appl. No.: 12/540,616

(22) Filed: Aug. 13, 2009

(65) Prior Publication Data
US 2010/0068059 A1    Mar. 18, 2010

(30) Foreign Application Priority Data
Sep. 18, 2008   (EP) ..................................... 08016491

(51) Int. Cl.
*F03D 11/00*   (2006.01)

(52) U.S. Cl. .................... 416/1; 416/146 R; 416/229 R; 416/230; 290/44; 290/55

(58) Field of Classification Search .......... 416/1, 146 R, 416/229 R, 230; 290/44, 55
See application file for complete search history.

(56) References Cited

U.S. PATENT DOCUMENTS

| | | | |
|---|---|---|---|
| 6,932,574 B2 * | 8/2005 | Wobben | 416/146 R |
| 7,249,935 B2 * | 7/2007 | Pedersen | 416/146 R |
| 2007/0009361 A1 * | 1/2007 | Moller Larsen et al. | 416/146 R |
| 2007/0114797 A1 * | 5/2007 | Krug et al. | 290/44 |

FOREIGN PATENT DOCUMENTS

| | | |
|---|---|---|
| EP | 1 568 883 A2 | 8/2005 |
| EP | 1 788 241 A2 | 5/2007 |
| WO | 0186144 A1 | 11/2001 |
| WO | 03054389 A1 | 7/2003 |
| WO | 2004001224 A1 | 12/2003 |

* cited by examiner

*Primary Examiner* — Igor Kershteyn

(57) ABSTRACT

A lightning protection system is provided for protecting a device for exterior use, in particular a wind turbine, from damages based on a lightning stroke. The lightning protection system includes a choke element. The choke element is adapted for being mounted around a shaft of the device in such a manner that a current flow through the shaft causes a magnetic flux in the choke element.

20 Claims, 2 Drawing Sheets

LIGHTNING PROTECTION SYSTEM FOR A WIND TURBINE

CROSS REFERENCE TO RELATED APPLICATIONS

This application claims priority of European Patent Office application No. 08016491.6 EP filed Sep. 18, 2008, which is incorporated by reference herein in its entirety.

FIELD OF INVENTION

The present invention relates to the field of wind turbine systems. The present invention relates furthermore to a lightning protection system for protecting a device for exterior use, in particular to a wind turbine, from damages based on a light stroke. Moreover, the present invention relates to a wind turbine system and a method of protecting a device for exterior use, in particular a wind turbine, from damages based on a lightning stroke.

ART BACKGROUND

Wind turbines are required to be equipped with lightning protection systems in order to ensure that large currents in lightning bolts or lightning strokes may be conducted to the ground without damaging the components of the turbine.

Wind turbine blades may be the part of a wind turbine that are most exposed to lightning strokes and therefore it may be a task of the lightning protection system of a wind turbine to provide a save conduction path from the blades to the ground. This may be challenging because some of the components of the wind turbine may be able to rotate relative to each other. Specifically the wind turbine blades may be able to rotate around their longitudinal axis, i.e. the pitch, and at the same time the main shaft of the wind turbine, which carries the blades, may be able to rotate relative to a nacelle of the wind air turbine. Furthermore, the nacelle may be able to rotate around a vertical axis of the wind turbine to ensure that the wind turbine is always facing the wind, i.e. the nacelle may be able to rotate around its yaw axis.

Thus, the current from a lightning stroke striking a wind turbine blade passes through free rotational bearings on its way to the ground.

Pitch and yaw movements are relatively slow and limited in its extent. Therefore it may comparatively easy to provide conduction paths which bypass the pitch and the yaw bearings, for instance by using metallic brushes or rollers.

However, the main shaft of the wind turbine rotates continuously and at a higher speed than the pitch and the yaw bearings. The main shaft may be supported by the base of the nacelle through one or more massive bearings. These massive bearings are also made of metal and therefore provide a natural conduction path for the currents in the lightning strokes. However, the effective contact areas between rolling elements of the bearings and inner and outer races may be small and thus large current densities in the contact area of the inner and outer races may occur.

A high current density may generate a high temperature in the contact areas that may lead to a damage of the bearings.

EP 1 788 241 A2 discloses a method for directing a current generated by a lightning stroke. The method includes directing the current from a main shaft of the wind turbine to a break disk attached to the shaft and directing the current from the break disk to one of a spark gap and a roller mechanism coupled to a down-conductor at a ground voltage.

EP 1 568 883 A2 describes a wind energy generator comprising a propeller driven generator in a housing that is mounted on a pillar. The wind energy generator is protected against lightning strokes by a conductor system that is coupled to the ground. The wind energy generator therefore uses a slip ring and a brush to provide a connection between rotary and stationary parts.

SUMMARY OF THE INVENTION

It may be an object of the invention to provide a wind turbine that is resistive against a lightning stroke.

This object may be solved by the subject-matter according to the independent claims, in particular by light protection system, a wind turbine system and a method of protecting a device for exterior use, in particular a wind turbine, from damages based on a lightning stroke. Exemplary embodiments of the present invention are described by the dependent claims.

According to a first, exemplary embodiment of the invention there is provided a light protection system for protecting a device for exterior use, in particular a wind turbine, from damages based on a lightning stroke. The lightning protection system comprises a choke element. The choke element is adapted for being mounted around a shaft of the device in such a manner that a current flow through the shaft causes induced magnetic flux current in the choke element.

According to a further exemplary embodiment of the invention a method of protecting a device for exterior use, in particular a wind turbine, from damages based on a lightning stroke is described. A choke element is mounted around a shaft. The current flow through a shaft causes a magnetic flux in the choke element.

With the device for exterior use, electronic devices may be described that are intended to be used in a natural environment and therefore may be exposed directly to thunderstorms and storms. The device to be protected may comprise for instance a wind turbine that ought to be protected from damages caused by lightning strokes.

The choke element may comprise a ring element that is mounted around a shaft of the wind turbine. The choke element may be coupled to the shaft without providing any electrical link between the shaft and the choke element. The choke element may be coupled in such a way, that for instance a current flow in the shaft causes a magnetic flux in the choke element and thus induces an induced current in the choke element. However, an electrical coupling between the shaft and the choke device should be prevented.

The choke element may be mounted in physical contact around the shaft or without any physical contact around the shaft, as long as an electrical coupling may be prevented. The choke element may be fixed to a housing or nacelle of a wind turbine, so that no physical contact, i.e. a gap, between the choke element and the shaft is provided. Furthermore, if the choke element is electrically isolated, the choke element may also be fixed to the shaft, for instance by a press-fit connection. The choke element may be a ring that completely surrounds the shaft but may be also a ring with a gap, so that the shaft will only be partially surrounded.

The lightning stroke may generate a current in the shaft, wherein the current varies rapidly, i.e. the lightning stroke generates high current peaks over a short time period. Due to the rapidly varying current a magnetic field inconstant in time may be generated around the shaft. This varying magnetic field inconstant in time causes a varying magnetic flux in the choke element and thus induces the induced current in the choke element. The induced current may be in particular an eddy current, wherein the eddy current load may be caused by the magnetic flux. The induced current, in particular the eddy current, may generate heat that may be transferred to the environment of the choke element, so that the overall energy of the caused magnetic flux and the induced current respectively may be reduced. In other words, the generation of the magnetic flux in the choke element leads to a reduction of the overall energy and in particular to a reduction of the current peaks in the shaft. Thus, the elements that are connected to the shaft behind the choke element in the current flow direction may receive a lower current than without the choke element. Thus, a lightning protection may be provided. Furthermore, the caused magnetic flux in the choke element, may generate a magnetic field that opposes the magnetic field of the shaft, so that the flow of electrons along the shaft in the current direction may be limited (e.g. according to the Lenz Law). Thus, the elements that are connected to the shaft behind the choke element in the current flow direction may receive a lower current than without the choke element.

The current damping effect of the choke element may adjusted by varying the size of the choke element. The more material for the choke element is provided, the more the magnetic flux and the induced current increases and thus the more energy may be diverted from the current in the shaft.

According to a further exemplary embodiment the light protection system further comprises a diverting element. The choke element is adapted for partitioning the shaft in a high potential region and a low potential region. The high potential region is adapted to be exposed to an electrical current caused by the lightning stroke and wherein the low potential region is adapted to be connected to an element of the device which is to be protected. The diverting element is adapted for discharging at least a part of the current from the high potential region of the shaft.

The choke element is adapted for partitioning the shaft in a high potential region and a low potential region. This may be caused by the choke element, in particular by the generation of the magnetic flux and the induced current, respectively, due to the current flow in the shaft. As a consequence, the electrical potential before the choke element is higher than behind the choke element in current flow direction, so that behind the choke element a reduced current peak is provided. Thus, the current from a lightning stroke will give rise to a difference in electrical potential across a region of the shaft. I.e., the side closest to the source of the current, such as the side closest to the lightning stroke, comprises a high potential and the side from the choke element that is farthest away from the current source comprises the lowest potential. The effect of the choke element to increase the electrical impedance inside the choke element may also be based for instance on the Lenz's law, wherein the magnetic flux and the induced current of the choke element produces a magnetic field that opposes the change in magnetic field or flux of the shaft. I.e., the magnet field of the choke element that is induced by the current from the lightning stroke opposes the magnet field of the shaft and thus a barrier or an impedance for the electrons passing the region of the shaft is generated, at least on the region where choke element is located. Thus, the electrical impedance in the region of the choke element increases and thus the potentials before the choke element becomes a high potential and the region behind the choke element becomes a low potential.

The diverting element may comprise an electric contact or link with the high potential region of the shaft or may be otherwise adapted of providing the electrical link with the high potential region of the shaft. Hence, due to the electrical potential difference between the high potential region and the low potential region, the current preferably flows from the high potential region to the diverting element. I.e., from the high potential region at least a part of the current flows from the high potential region to the diverting element. As a result, the part of the current that still flows from the low potential region to elements of the device may be reduced because the major part of the current already flew through the diverting element.

Thus, a current from a lightning stroke may be discharged from the shaft at the high potential region without guiding all the current through the elements of the device which are to be protected. For instance, without providing a discharge by the diverting element, a high current density and an ensuing high temperature in the contact zone with the shaft and the element to be protected may occur. Thus, this would lead to a damage of the element, such as a bearing. Therefore, with the claimed invention an alternative conduction path will be provided to ensure that only a small part of the current passes through the bearing or other elements of the device, wherein the major part of the current passes through diverting element. The diverting element is adapted for bypassing the current, caused by a lightning stroke, to the ground.

According to a further exemplary embodiment of the invention, the diverting element is spaced from the shaft for providing a spark gap. When the electrical potential of the high potential region of the shaft is increased beyond a certain level an electric arc may be formed across the spark gap. The arc may for instance short-circuit the high potential region of the shaft to a base plate of a nacelle that is connected to a wind turbine tower and to the ground, for instance. Thus, a contact-free lightning protection system may be provided. There may be no need to connect the diverting element directly, i.e. with physical contact, to the shaft.

According to a further exemplary embodiment, the lightning protection system further comprises a buffer element. The buffer element is adapted for providing an electrical link between the shaft and the location where the diverting element discharges the current from the shaft. Due to a high current flow or due to the electric arc, high temperatures may occur that may damage the shaft material. Therefore, the buffer element may comprise a metallic ring surrounding the shaft. The diverting element may be placed in the vicinity to the metallic ring so that the discharge of the shaft occurs over the buffer element or in particular over the metallic ring. Thus, the metallic ring may provide the discharge of the shaft over the spark gap. Any damage due to the electric discharge over the spark gap will instead occur at the buffer element rather than in the shaft itself. I.e., the temperature that is caused by the electric arc or the electric discharge is generated at the buffer element and not at the shaft itself.

According to a further exemplary embodiment the buffer element is adapted to be exchangeable fixed to the shaft. Thus, if the buffer element is worn out due to a couple of electrical discharges, a new buffer element may easily be installed without exchanging the complete shaft or other complicated installations of the device. Thus, a long-term run of the wind turbine may be provided without large maintenance times.

According to a further exemplary embodiment, the diverting element comprises a metallic tip. The metallic tip is adapted to provide the electrical link between the shaft and the diverting element. The metallic tip may provide thin electric pins and may be in slidable contact with the shaft or in a defined spacing from the shaft in order to provide the electrical link. Around the surface of the shaft, a plurality of metallic tips may be provided so that for instance a plurality of discharging areas at the high potential region of the shaft may be provided. Thus, an improved and proper discharging effect may be provided. Furthermore, by using proper metallic tips, an exchange of damaged metallic tips may be eased. Furthermore, if one metallic tip is worn out due to the high temperature of the current flow, the other metallic tips may still provide the electrical link, so that a redundant function may be provided.

According to a further exemplary embodiment, the choke element comprises a conducting coil. The conducting coil is arranged in such a way that at least a part of the induced current is induced in the conducting coil. With other words, the caused magnetic flux in the choke element generates a magnetic field around the choke element, such that a further magnetic flux in the conducting coil will be caused and a further induced current will be induced in the conducting coil. Furthermore, the magnetic field around the shaft may directly induce current into the conducting coils. The further induced current in the conducting coil may transform the energy or the current into heat. Thus, the part of the current that passes the choke element is further reduced because a further part of the current is transformed into heat by the coils. Thus, the protecting effect of the choke element may be improved because less current flows through the device elements to be protected. The conducting coil may be formed of or may comprise copper for instance.

According to a further exemplary embodiment, the choke element comprises a plurality of conducting coils. The plurality of conducting coils is short-circuited with each other. I.e. the beginning of a conductor of a coil may be connected to an end of a conductor of the same coil or another coil. Thus, a rapidly varying magnet field in the choke element may induce further induced current in the short-circuited conducting coils so that due to the rapidly increasing current of the lightning stroke a rapidly increasing magnet field and a further induced current may be provided. As a result, additional energy drain and increase of impedance of the shaft inside the choke ring may be provided. Thus, the partition of the high potential region and the low potential region may be improved and the part of the current discharged from the high potential region of the shaft may be increased.

According to a further exemplary embodiment, the choke element comprises permeable materials. Permeable materials may comprise a permeability value μ>1. Under the term magnetic materials, ferromagnetic material comprising a permeability value μ>1 may be described. Permeable materials are only magnetic in the presence of an external applied magnetic field. Paramagnetic materials are attracted to magnetic fields and enforce the magnetic field. Under the term ferromagnetism, magnetic materials are described that provides a permeable magnetism even without a primary magnetic field.

According to a further exemplary embodiment, the choke element comprises laminated silicium ferrum (SiFe).

According to a further exemplary embodiment, a device, in particular a wind turbine device, is provided. The wind turbine system comprises a shaft and a lightning protection system as denoted above and an element of the device, which is to be protected. The element of the device, which is to be protected, is electrically coupled to the shaft. A current flowing from the shaft to the element of the device is reduced compared with the current induced to the shaft by a lightning stroke by lightning protection system.

Furthermore, the device may comprise a wind turbine blade and a nacelle. The element of the device is adapted to be electrically linked or coupled to the low potential region of the shaft and to the nacelle. The at least one wind turbine blade is fixed to the high potential region of the shaft. The diverting element is adapted to discharge a first part of the current caused by the lightning stroke at the wind turbine blade from the high potential region to the nacelle. The element of the device receives a second part of the current. A first part of the current is thereby higher than the second part of the current. Thus, by the separation of the shaft in a high potential region and a low potential region, the first higher part of the current may be bypassed with regard to the elements of the device which are to be protected. The lower second part of the current still flows through a current path that flows from the low potential region of the shaft through the elements of the device and further on to the nacelle. Thus, the higher first part of the current that may damage the elements of the device is bypassed and is thus not flowing through the elements, so that the elements may be kept save even during a lightning stroke broken into the wind turbine blades.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

In the following, exemplary embodiments of the present invention will be described for further explanation and for a better understanding with reference to the attached drawings.

DETAILED DESCRIPTION

Figure 1:
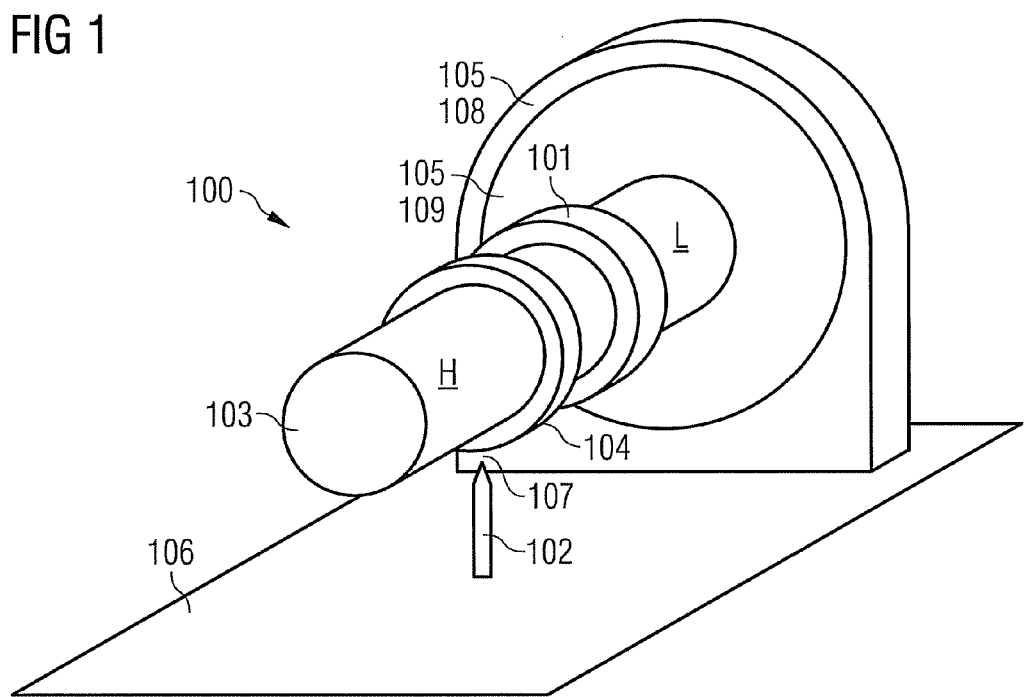
FIG. 1 shows a schematic view of a shaft of a wind turbine according to an exemplary embodiment of the present invention.

The illustration in the drawing is schematically. It is noted that in different figures, similar or identical elements are provided with the same reference signs or with reference signs, which are different from the corresponding reference signs only within the first digit.

FIG. 1 shows a schematic view of an exemplary embodiment of the present invention. It is illustrated a lightning protection system 100 for protecting a device for exterior use, in particular a wind turbine, from damages based on a lightning stroke. The lightning protection system 100 comprises a choke element 101. The choke element 101 is adapted for being mounted around a shaft 103 of the device in such a manner that a current flow through the shaft 103 causes a magnetic flux in the choke element 101.

Moreover, FIG. 1 illustrates a diverting element 102. The choke element 101 is adapted for partitioning the shaft 103 in a high potential region H and a low potential region L. The high potential region H is adapted to be exposed to an electric current caused by the lightning stroke and wherein the low potential region L is adapted to be connected to an element of the device 105 which is to be protected. The diverting element 102 is adapted for discharging at least a part of the current from the high potential region H of the shaft 103.

The shaft 103 may be supported by a nacelle 106 through one or more elements of the device 105, such as bearings 109 and metallic bearing housings 108. The effect of the choke element 101 may be to absorb energy from the current flow of the shaft 103. I.e., the current flow in the shaft 103 generates the magnetic flux in the choke element 101 and induces an induced current in the choke element 101. Thus, the induced current in the choke element generates heat that may be transferred to the environment of the choke element. Hence, the current in the shaft 103 is reduced when passing the choke element 101.

Furthermore, the electrical impedance in a region where the choke element 101 surrounds the shaft 103 may be increased. As a consequence of the increase in impedance the shaft 103 is divided in a high potential region H and a low potential region L. The side closest to the source of the currents, i.e. the side closest to the wind turbine blades, provides a higher potential region of the shaft 103. The side after the choke element 101 along the current flow direction, i.e. the side that is farthest away from to the source of the currents, provides a lower potential region of the shaft 103.

The difference in the electrical potential across the regions of the shaft 103 may be generated very briefly. Therefore, the diverting element 102 provides an alternative conduction path for discharging the part of the current from the high potential region H of the shaft 103. The diverting element 102 may be a conductor that is electrically linked to the high potential region H of the shaft 103. Furthermore, the diverting element 102 may be placed spaced from the high potential region H of the shaft 103 and thus providing a spark gap 107.

In an exemplary embodiment shown in FIG. 1, a buffer element 104, such as a metallic ring, may be placed to the shaft 103. The electrical link may be discharged starting from the shaft 103 over the buffer element 104 to the diverting element 102.

The diverting element 102 may provide a plurality of pointed metallic tips connected for instance to a base plate of the nacelle 106. When the electrical potential in the high potential region H of the shaft 103 is increased beyond a certain level, an electric arc will be formed across the spark gap 107. The spark gap 107 may be provided between the shaft 103 and the diverting element 102 or, when available, between the buffer elements 104 and the diverting element 102. The diverting element 102 may comprise e.g. the metallic tips. This arc may be short-circuiting the shaft 103 to the base plate of the nacelle 106 so that a discharging of the shaft 103 occurs.

The discharging of the shaft 103 will occur over the spark gap 107, e.g. due to the separation of the shaft 103 in the high potential region H and the low potential region L by the choke elements 101. Furthermore, the choke element 101 comprises a high impedance in the region of the shaft 103 where the choke element 101 is placed. Thus, the overall impedance of a conducting path starting from the choke element 101 over the low potential region L to the element of the device 105, 108, 109 and to the nacelle 106 and finally to the grown will be higher than the overall impedance of the conductive path starting from the highest potential region H over the spark gap 107 to the diverting element 102 and to the nacelle 106 and finally to the ground. The current in the lightning stroke will tend to seek the path to the ground with the lowest impedance. The choke ring 101 may ensure that in the region where the choke ring 101 provides an opposed directed magnetic field with respect to the magnetic field of the shaft 103, a higher impedance will be provided in the rotating shaft 103. Therefore a higher charge will be provided in the high potential region H, so that a current tend to follow the path across the spark gap 107 as through the elements 105 connected to the low potential region L.

Furthermore, as shown in FIG. 1, the buffer element 104 surrounds the shaft 103 to prevent a damage of the shaft 103 due to the electric discharge in the spark gap 107 or the diverting element 102. The damage will occur due to a high temperature due to the discharge of the current over the spark gap 107. The damage due to this electric discharge will instead occur on the buffer element 104 which may be provided exchangeable. Thus, abrasion of the essential element of a wind turbine, such as the shaft 103 or bearing elements 108, 109, will be reduced.

Figure 2:
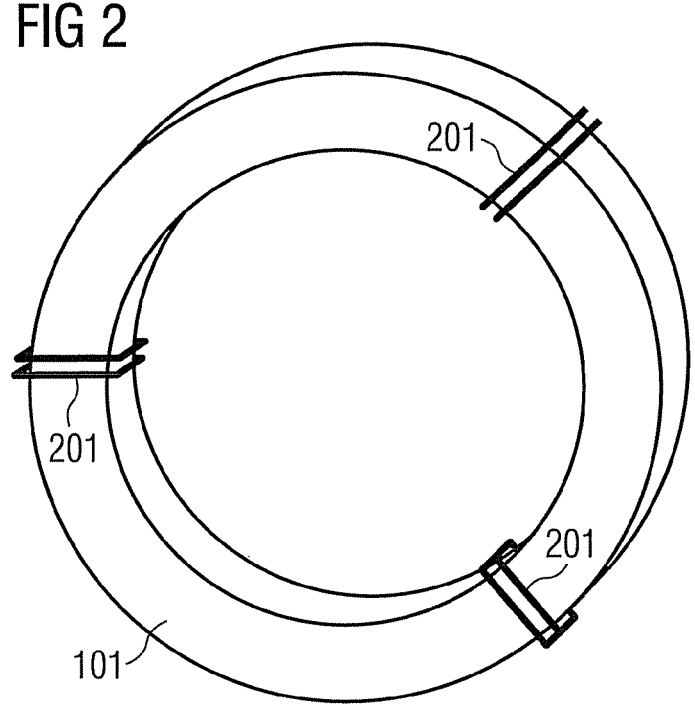
FIG. 2 shows a schematic view of the choke element including conducting coils according to an exemplary embodiment of the present invention.

FIG. 2 shows the choke element 101 in a detailed view. The choke elements 101 may comprise a material made of a high magnetic permeability, such as a permeability $\mu > 1$, for instance laminated SiFe. Furthermore, the choke elements 101 may comprise a conducting coil 201 or also a plurality of conducting coils 201. The conducting coils 201 may comprise materials made of copper, for instance. Furthermore, the conducting coils 201 may be short-circuited, i.e. to ends of the conductors of the conducting coils 201 may be connected to each other.

Figure 3:
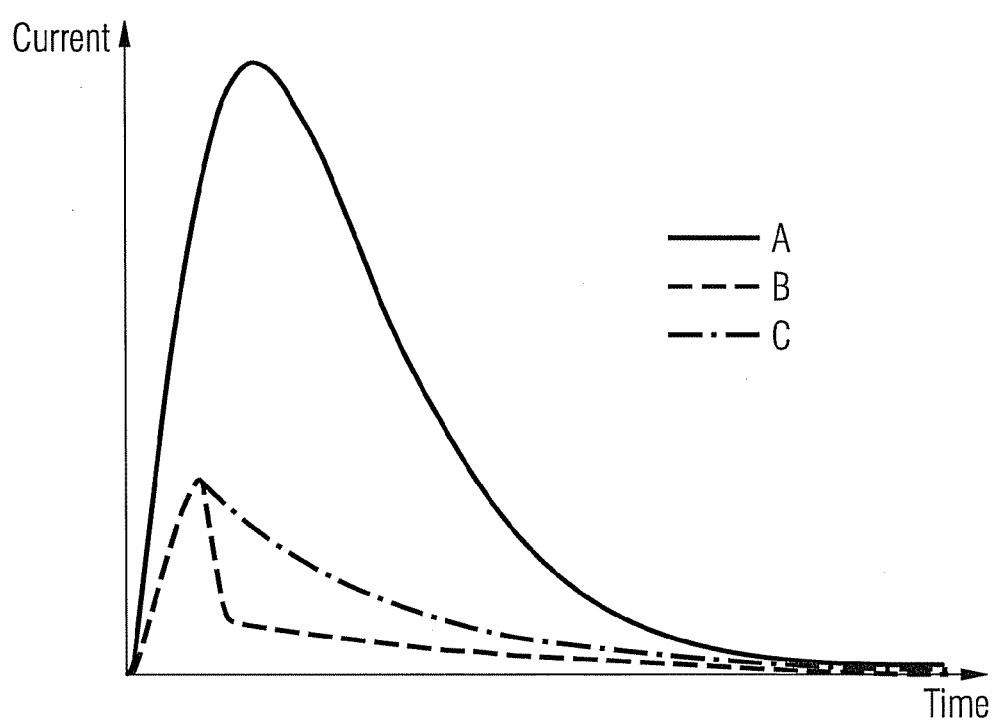
FIG. 3 shows a diagram with curves of the time dependency of a current through an element of the device, which is to be protected, when a lightning bolt has struck a part connected to the high potential region of the shaft.

FIG. 3 shows a diagram with a curve of the time dependence of the current through elements of the device 105, such as a wind turbine, when a lightning stroke has struck a wind turbine blade or a hub of the turbine that may be connected to the high potential region H of the shaft 103.

Curve A of FIG. 3 illustrates the time dependency of the current when no choke element 101 has been mounted on the main shaft 103. The current increases very rapidly until it reaches a maximum of several tenths of kA [kilo ampere], for example. The current then slowly decreases until the entire charge and the lightning stroke has been conducted to the ground.

Curve B of FIG. 3 illustrates a current/time curve wherein the choke element 101 with the conducting coils 201 is mounted around the shaft 103. Furthermore, Curve B of FIG. 3 illustrates the shaft 103 including the buffer element 104. When the front of the current pulse from the lightning stroke reaches the shaft 103, the magnetic flux in the choke element 101 will be caused and the induced current will be induced in the choke element 101 and thus a magnetic field in the choke element 101 is generated. The choke element 101 thus may act in a way similar to an inductor, i.e. the part of the main shaft 103 which may be surrounded by the choke element 101 may have a high impedance due to rapidly varying currents.

Furthermore, the rapidly varying magnetic field in the choke element 101 may induce a further induced current in the short circuited coils 201, for instance. This may be act as an additional energy drain due to heat generation and hence increases the impedance of the shaft 103 inside, respectively in the region of the choke element 101.

However, the high impedance to rapidly varying currents may provide two effects. The initial increase in current through the elements of the device 105 and/or the low potential region L may be less than in the case where no choke element 101 is present. This may be seen from curve A that shows a curve with a much steeper initial slope than curve B or C, which are curves for the shaft 103 including the choke element 101. Furthermore, when the front of the current pulse of the lightning stroke reaches the choke element 101, a large potential difference will arise between the regions of the shaft 103, in particular on the one side a high potential region H and on the other side a low potential region L may be provided. The region closest to the elements of the device 105 may be initially at ground potential and may remain at a relatively low potential, in particular at a potential of the low potential region L.

When the electrical potential across the spark gap 107 becomes large enough an electric arc will be generated across the spark gap 107. The arc will constitute a low impedance path directly to the base plate of the nacelle 106 and from there to the ground, for instance. When the arc is generated the current through the elements of the device 105 will therefore decrease such as shown in FIG. 3, curve B or C. After a short time most of the charge from the lightning stroke may have passed the spark gap 107 and the voltage difference across the spark gap 107 is reduced so that no discharge occurs anymore.

In the presence of short-circuited conducting coils 201, a part of the energy may be induced as currents in the conducting coils 201 by of the induced current in the choke element 101, which current may be further transformed into heat.

Curve B illustrates a current discharging by providing a choke element 101 that includes the conducting coils 201. Curve C illustrates a current discharging without the conducting coils 201. When the conducting coils 201 are present, as shown in curve B, at least some of the energy from the magnetic field of choke element 101 will be used to induce currents in the conducting coils 201 and the rest current through the elements of the device 105 may be lowered (curve B).

When the voltage difference across the spark 107 becomes too small to maintain the electric arc, the rest of the charge from the lightning stroke may have to pass through the elements of the device 105. This rest may be only a small fraction of the total charge of the lightning stroke so that the risk of a damage of the elements of the device 105, to be protected, will be reduced.

When the electric arc disappears, the current through the elements of the device 105 will briefly decrease. This decreased current may be small because the larger part of the charge from the lightning stroke may already been conducted to the ground by the diverting element 102. The current increase in the elements of the device 105 will be further damped because the rapid increase of currents leads to a high impedance due to these rapidly varying currents, as explained above. The value of the current passing through the elements of the device 105 will be reduced by the presence of the choke element 101. Therefore the risk of damage caused by the lightning stroke to the elements of the device 105 may be reduced.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A lightning protection system for protecting a wind turbine device for exterior use from damages based on a lightning stroke, the lightning protection system comprising:
 a ring element adapted for being mounted around a shaft of the device wherein the ring element is electrically isolated from the shaft such that a current flow through the shaft causes a magnetic flux in the ring element.

2. The lightning protection system of claim 1, further comprises:
 a diverting element,
 wherein the ring element is adapted for partitioning the shaft into a high potential region and a low potential region,
 wherein the high potential region is adapted to be exposed to an electrical current caused by the lightning stroke,
 wherein the low potential region is adapted to be connected to an element of the device which is to be protected, and
 wherein the diverting element is adapted for discharging at least a part of the current from the high potential region of the shaft.

3. The lightning protection system of claim 2, wherein a space is arranged between the diverting element and the shaft in order to provide a spark gap.

4. The lightning protection system of claim 3, further comprises:
 a buffer element that is adapted for providing an electrical link between the shaft and the diverting element.

5. The lightning protection system of claim 4, wherein the buffer element is adaptable to be exchangeably fixed to the shaft.

6. The lightning protection system of claim 2, further comprises:
 a buffer element that is adapted for providing an electrical link between the shaft and the diverting element.

7. The lightning protection system of claim 6, wherein the buffer element is adaptable to be exchangeably fixed to the shaft.

8. The lightning protection system of claim 2, wherein the diverting element comprises a metallic tip that is adapted to provide an electrical link between the shaft and the diverting element.

9. The lightning protection system of claim 1, wherein the ring element comprises a conducting coil arranged such that at least a part of the current flow through the shaft is induced in the conducting coil.

10. The lightning protection system of claim 9,
 wherein the ring element comprises a plurality of conducting coils, and
 wherein the plurality of conducting coils is short circuited with each other.

11. The lightning protection system of claim 1, wherein the ring element comprises a permeable material.

12. The lightning protection system of claim 11, wherein the ring element comprises laminated SiFe.

13. A wind turbine device, comprising:
 a shaft;
 an element of the device to be protected; and
 a lightning protection system including a ring element mounted around a shaft of the device wherein the ring element is electrically isolated from the shaft such that a current flow through the shaft causes a magnetic flux in the ring element,
 wherein the element of the device to be protected is electrically coupled to the shaft, and wherein a current flowing from the shaft to the element of the device is reduced compared with to the current induced to the shaft by a lightning stroke by lightning protection system.

14. The wind turbine device of claim 13, wherein the lightning protections system further comprises:
 a diverting element,
 wherein the ring element partitions the shaft into a high potential region and a low potential region,
 wherein the high potential region is adapted to be exposed to an electrical current caused by the lightning stroke, wherein the low potential region is adapted to be connected to an element of the device which is to be protected, and wherein the diverting element discharges at least a part of the current from the high potential region of the shaft.

15. The wind turbine device of claim 14, wherein a space is arranged between the diverting element and the shaft in order to provide a spark gap.

16. The wind turbine device of claim 15, further comprises:
a buffer element that provides an electrical link between the shaft and the diverting element.

17. The wind turbine device of claim 16, wherein the buffer element is exchangeable fixed to the shaft.

18. The wind turbine device of claim 14, wherein the diverting element comprises a metallic tip that provides an electrical link between the shaft and the diverting element.

19. The wind turbine device of claim 13, wherein the ring element comprises a conducting coil arranged such that at least a part of the current flow through the shaft is induced in the conducting coil.

20. A method of protecting a wind turbine device for exterior use from damages based on a lightning stroke, the method comprising:
mounting a ring element around a shaft of the device;
electrically isolating the ring element from the shaft; and
causing a magnetic flux in the ring element by a current flow through the shaft.

\* \* \* \* \*